United States Patent Office 3,307,853
Patented Mar. 7, 1967

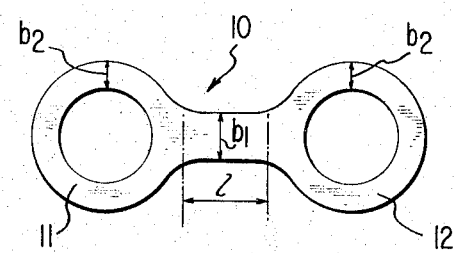
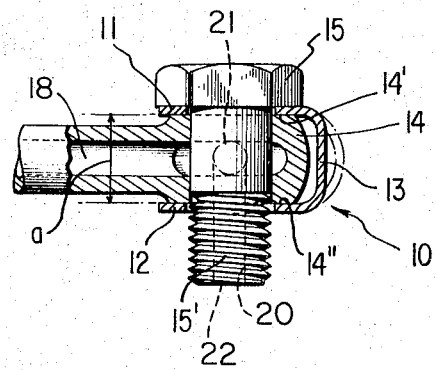
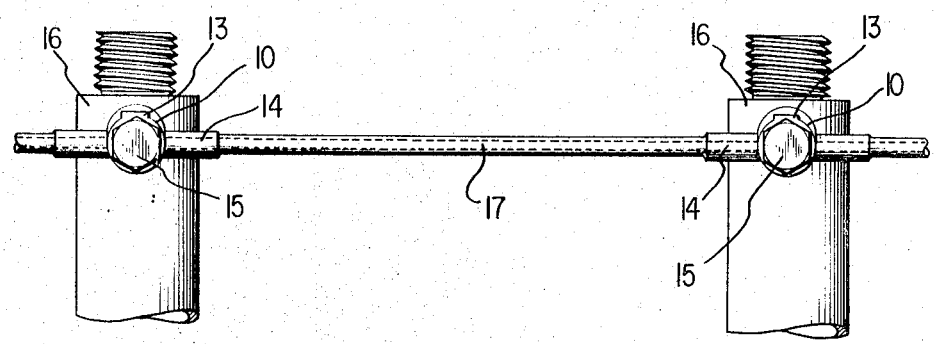

3,307,853
SEALING RING ASSEMBLY
Franz Hauk, Fellbach, Germany, assignor to Daimler-Benz Aktiengesellschaft, Stuttgart-Unterturkheim, Germany
Filed Dec. 3, 1963, Ser. No. 327,610
Claims priority, application Germany, Dec. 8, 1962, D 40,467
5 Claims. (Cl. 277—58)

The present invention relates to an arrangement for sealing ring assemblies adapted to be mounted on hollow screws which are connected with pipe lines, especially with fuel lines provided within motor vehicles, whereas the hollow screws are screwed into a housing, a feed nipple or any other connecting piece.

It is known that for purposes of sealing annular structures or ring assemblies adapted to be mounted over hollow screws or through which are inserted hollow screws, two sealing rings made of copper, aluminum or similar materials are utilized which rest against the sealing surfaces of the ring assembly or ring pieces. One of the sealing rings is thereby disposed between the screw head of the hollow screw and the sealing surface of the ring assembly facing the same, whereas the other sealing ring is provided between the sealing surface of the ring assembly opposite the head screw and the wall of a housing or of a connecting nipple which may be arranged, for example, at the nozzle holder of the injection nozzle of an injection pump. During the installation or disassembly of such a connection, there exists a danger, especially at places accessible only with difficulty as is the case in an engine space of a motor vehicle, that the sealing ring provided between the walls of the housing or a connecting piece and the sealing surface of the ring assembly opposite the head of the hollow screw is wiped off or slips off the shank of the hollow screw and is lost thereby; the sealing ring may thereby, for example, fall into the engine housing and may cause considerable damage. Furtermore, the assembly and installation becomes particularly time-consuming if several connections of this type are arranged at a common fuel line. A further disadvantage consists in that the sealing rings may tilt and twist during the installation and do not come into abutment evenly against the sealing surfaces of the ring assembly or annular structure whereby deformations of the sealing rings occur upon tightening of the hollow screw so that a complete seal is no longer assured between the individual elements.

The present invention aims at eliminating the aforementioned disadvantages, and essentially consists in that sealing rings are coordinated to the two sealing surfaces of the ring assembly which are connected with one another and which form with the connecting portion thereof a springy bow-type sealing clip.

The present invention further essentially consists in that the connecting portion between the two sealing rings consists of a narrow web portion, the width of which corresponds approximately to the width of the sealing surfaces of the sealing rings and the length of which corresponds approximately to the distance between the two sealing surfaces of the ring assembly or ring pieces.

One achieved by the use of the construction of the sealing means in accordance with the present invention between the hollow screw and the ring assembly or ring pieces adapted to be mounted or placed thereon, on the one hand, a considerable reduction in time during the disassembly and installation and, on the other, one avoids damages which might be caused by lost sealing rings. Furthermore, the bow-type sealing clip may be preassembled in an advantageous manner by being clamped over the ring assembly. Additionally, there is achieved by the springy or resilient connecting web portion that the two sealing rings abut parallel to one another whereby a complete seal without deformation of the sealing rings is assured.

Accordingly, it is an object of the present invention to provide a sealing arrangement for ring assemblies mounted on or carried by hollow screws which avoids, by extremely simple means, the shortcomings and drawbacks encountered with the prior art constructions.

It is another object of the present invention to provide a sealing arrangement for sealing annular pieces adapted to be placed on hollow screws which not only facilitates assembly and disassembly, but also eliminates the danger of loss of the sealing rings resulting in possible damage to the engine.

Still another object of the present invention resides in the provision of a sealing arrangement for sealing ring assemblies carried by hollow screws which permits a preassembly of the sealing ring structure and, in a general way, reduces the relatively time-consuming assembly and disassembly necessary with the prior art arrangements.

Still a further object of the present invention resides in the provision of a sealing ring assembly adapted to be mounted on a hollow screw which assures flat abutment of the sealing rings in a completely even and uniform manner without deformation of the sealing elements.

These and other objects, features and advantages of the present invention will become more obvious from the following description when taken in connection with the accompanying drawing which shows, for purposes of illustration only, one embodiment in accordance therewith, and wherein:

FIGURE 1 is a plan view of a bow-type sealing structure or element in accordance with the present invention, illustrated in the unfolded condition thereof;

FIGURE 2 is a cross sectional view through the sealing arrangement in accordance with the present invention, illustrating the assembled bow-type sealing element together with a hollow screw and a ring assembly, and FIGURE 3 is a partial elevational view illustrating a further application of the bow-type sealing element of the present invention to a fuel system of a motor vehicle.

Referring now to the drawing wherein like reference numerals are used throughout the various views to designate like parts, and more particularly to FIGURE 1, reference numeral 10 generally designates therein a bow-type sealing member which is illustrated in the unfolded condition. This bow-type sealing member 10 consists of two identical sealing rings 11 and 12 and of a web portion 13 connecting the two sealing rings 11 and 12. The width $b_1$ of the web portion 13 corresponds approximately to twice the width $b_2$ of either of the sealing surfaces of the sealing surfaces of the sealing rings 11 and 12 and the length $l$ thereof approximately to the distance $a$ between the two sealing surfaces 14' and 14" of the ring-shaped part of the ring assembly 14 a first duct member illustrated in FIGURE 2. This member is provided with fluid passage means 18. The bow-shaped sealing member 10 which in its configuration corresponds to the shape of spectacles, is, after being punched out from a sheet metal made of copper, aluminum, or the like, bent into the shape corresponding to that shown in FIGURE 2 whereby the web portion 13 may be directed perpendicular to the sealing rings 11 and 12 as shown in full line in FIGURE 2, or may be curved as indicated in dash lines of FIGURE 2. The particular configuration of the web portion 13 only depends on the manner in which it is bent into the desired final shape. After the bow-type sealing member 10 is brought to the desired form, it is placed in a fork-like manner over the ring-shaped part of the ring assembly or annular piece 14.

Upon insertion of a hollow screw 15 having apertures and 22 connected by duct 20 illustrated in FIGURE into the bore of the sealing ring 11, the shank 15' of e hollow screw 15 or third duct members centers the cond sealing ring 12. The hollow screw 15 is now readed into a threaded bore of a housing or of a con- cting piece arranged at a nozzle holder 16 or second ict member as shown in FIGURE 3, this member hav- g a fuel passageway 19. There is achieved by reason the springy web portion 13 that the two sealing rings and 12 abut parallel to one another.

FIGURE 3 illustrates an application of the bow-type aling member 10 according to the present invention to zzle holders 16 arranged one behind the other of an in- tion pump whereby the nozzle holders 16 are con- cted to a leakage oil line 17 which is provided with ring semblies or annular pieces 14 which are sealed with re- ect to the hollow screws 15 and the nozzle holders 16 means of the sealing rings 11 and 12 connected with le another by the web portion 13 in accordance with the esent invention.

While I have shown and described one embodiment in cordance with the present invention, it is understood at the same is not limited thereto, but is susceptible of imerous changes and modifications as known to a per- n skilled in the art, and I therefore do not wish to be nited to the details shown and described herein, but in- nd to cover all such changes and modifications as are compassed by the scope of the appended claims.

I claim:
1. Sealing means for fluid receiving duct means com- ising:
   a first duct member including ring structure,
   a second duct member disposed with its longitudinal axis transverse to the longitudinal axis of said first duct member,
   a third duct member disposed between and communi- cating with said first and second duct members,
   said ring structure surrounding said third duct member and comprising spaced sealing surfaces,
   said sealing means further comprising sealing rings en- gaging said spaced sealing surfaces,
   connecting means between said sealing rings, said con- necting means comprising a connecting piece joining said sealing rings and forming therewith a bow-type sealing structure adapted to prevent the escape of fluid,
   said third duct member comprising a hollow screw member adapted for operative engagement with said second duct member thereby to bring pressure of said sealing rings on said spaced sealing surfaces.
2. Sealing means according to claim 1, wherein said connecting piece consists of a narrow web portion of a width approximately double the width of either of said sealing rings.
3. Sealing means according to claim 2 wherein the length of said web portion corresponds approximately to the distance between said two spaced sealing surfaces.
4. Sealing means according to claim 1, wherein said second duct member comprises a portion of the fuel line of a motor vehicle.
5. Sealing means according to claim 4, wherein said portion of said fuel line is a nozzle holder.

References Cited by the Examiner

UNITED STATES PATENTS

| | | | |
|---|---|---|---|
| 759,039 | 5/1904 | Smith | 151—53 |
| 898,333 | 9/1908 | Dawes | 151—53 |
| 2,021,571 | 11/1935 | Victor et al. | |
| 3,147,824 | 9/1964 | Henderson | 215—99 X |

LAVERNE D. GEIGER, *Primary Examiner.*

J. MEDNICK, *Assistant Examiner.*